United States Patent Office 3,093,438
Patented June 11, 1963

3,093,438
ASSISTING DYEING OF SYNTHETIC FIBERS WITH DISPERSE DYES AND ARYL ETHER ESTERS
Kurt Hofer, Neue Welt, Munchenstein, Switzerland, assignor to Sandoz Ltd., Basel, Switzerland
No Drawing. Filed Oct. 17, 1960, Ser. No. 62,896
Claims priority, application Switzerland Oct. 19, 1959
4 Claims. (Cl. 8—92)

The present invention relates to a process for the preparation of novel esters which are useful more especially as auxiliaries in the dyeing of textiles with disperse dyestuffs.

Briefly stated, the said novel esters are obtained by reacting compounds of the formula

wherein Ar is an aromatic radical which may or may not be halogenated, A is an alkylene group with 2 to 4 carbon atoms, and $n$ is one of the numerals 1 to 5 inclusive, with carboxylic acids or functional derivatives thereof.

An especially valuable group of compounds of the aforesaid formula is constituted by the phenoxy-, cresoxy- or xylenoxy-ethanols, -propanols and -butanols and their monoethylene-, monopropylene- and monobutylene-glycolethers.

The esters are advantageously employed in emulsified form, for they are substantially water-insoluble, to which end they may be dissolved in alcohol (ethanol) and emulsified in the dye-bath which preferably contains emulsifiers. However, the aforesaid esters can also be premixed with suitable emulsifiers and then emulsified in the dye-bath. Especially useful emulsifiers for this purpose are the ether-carboxylic acids, especially those of the formula

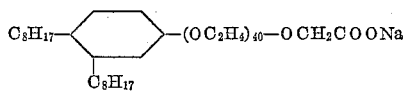

and those of the formulae $$C_{13}H_{27}(OC_2H_4)_nOCH_2COONa$$

and

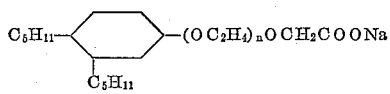

wherein $n$ is a whole number from 5 to 60 inclusive. Mixtures of these emulsifiers with each other and with other emulsifiers may also be used.

The esters are preferably employed in amounts of 1 to 5 (inclusive) grams per liter of dye-bath. In comparison with other compounds heretofore employed for the same purpose, the new esters are distinguished by the following:

They are odorless, not volatile in steam and thus less troublesome than for example chlorinated benzenes and methylsalicylate, which compounds due to their formation of condensate droplets during the dyeing engender the production of spots, and in addition are poisonous and malodorous. The new esters do not unfavorably influence the light fastness properties of the dyeings, in contrast for example to o-phenylphenol which is also used as a textile auxiliary, and do not result in yellowing. The new esters possess a better levelling action than the agents heretofore used for the same purpose, and they enhance the dyeability of wool by disperse dyes in polyester-wool mixtures.

The new esters are also suitable for the stripping of dyeings on polyester fibers and as levelling agents in the dyeing of cellulose acetate fibers, polyamide fibers, polyvinyl chloride fibers and polyvinylidene chloride fibers, as well as of fibers of copolymers made from vinyl chloride and vinylidene chloride as starting material.

Disperse dyes for the dyeing and printing processes in which the esters according to the invention are useful, are, for instance, described in "Synthetic Dyes" by Venkataraman, vol. I, pages 274 and 639 et seq. (1952).

The following examples set forth, by way of illustration, presently preferred embodiments of the invention. Parts and percentages are by weight; temperatures are in degrees centigrade.

Example 1

130 parts of o-chlorophenol are reacted with 50 parts of ethylene oxide at 140–150° in the presence of 0.6 part of sodium hydroxide. Then, at 80°, 1 part of sulfuric acid (100%) and 85 parts of glacial acetic acid are added, the mixture heated slowly to 140–150°, whereupon a mixture of acetic acid and water distils off. After heating for about 3 hours to 150°, nothing further distils, whereupon the last traces of unreacted acetic acid are removed by heating the reaction product for one hour to about 150° under reduced pressure. After cooling the reaction product, 2 parts of potassium carbonate are added and the mixture is filtered. There are obtained 225 parts of a brownish, practically odorless liquid having a specific gravity of 1.223 at 20° (substance A). By distilling this liquid in a high vacuum there is obtained, as main fraction, o-chlorophenoxyethylacetate which boils at 130–133° under a pressure of 2 mm. Hg; $D_4^{20}=1.264$, $n_D^{20}=1.5257$.

Example 2

370 parts of a crude dichloro-o-cresol mixture, obtained by the chlorination of o-cresol, are reacted at 140–150° with 100 parts of ethylene oxide after the addition of 2 parts of caustic soda. After cooling to 120°, 2 parts of concentrated sulfuric acid and 160 parts of glacial acetic acid are added, and the mixture heated to 160° by slowly passing a heated current of nitrogen therethrough. As soon as no more water-containing acetic acid distils off at 160°, the mixture is cooled to 80°, 3 parts of sodium bicarbonate are added and the mixture filtered. There is obtained a brown, practically odorless liquid having a specific gravity of 1.297 at 20°. The obtained crude dichloro-o-cresoxyethyl-acetate (acetic acid ester) (substance B) is insoluble in water, but is readily soluble in the usual organic solvents.

Example 3

0.6 part of caustic soda is added to 125 parts of a technical xylenol mixture, after which 80 parts of technical butylene oxide (mixture of about 70% 1,2-isomer and 30% 2,3-isomer) are run in the course of 3 hours at 150° and under reflux; stirring and heating to about 150° are continued until refluxing ceases (about 6 to 7 hours). To the so-obtained crude butyleneglycol-monoxylenylether, there is added 0.8 part of sulfuric acid, and then slowly and at 80° 102 parts of acetic anhydride. The temperature is then raised to 165° in the course of 2 to 3 hours under a weak stream of nitrogen and the formed acetic acid is distilled off. As soon as nothing further distils, i.e. after heating for 2 to 3 hours at 165°, the mixture is cooled and neutralized with morpholine. There are obtained 217 parts of a brownish, practically odorless liquid having a specific gravity of 1.023 at 20° (substance C). By distillation in a high vacuum, there is obtained as the main fraction a colorless liquid which boils at 125–130° under a pressure of 2.5 mm. Hg; $D_4^{20}=1.058$, $n_D^{20}=1.4956$.

Example 4

3 parts of caustic soda are dissolved in 650 parts of p-chlorophenol, and then 240 parts of ethylene oxide introduced at 140–150°. After cooling to 100°, 5 parts of sulfuric acid and 10 parts of Tonsil AC (bleaching earth) are added. 350 parts of aqueous formic acid (85% strength) are then run in and the mixture heated to 150° in the course of 4 hours, water and some formic acid being distilled off. The esterification is then completed by heating for two hours to 150° under a vacuum of about 200 mm. Hg. There are thus obtained 1050 parts of a brownish, practically odorless liquid which crystallizes on cooling; M.P. 42° (substance D).

Upon distillation under reduced pressure, there is obtained as main fraction p-chlorophenoxyethylformate which has a boiling point of 134–135° under a pressure of 3 mm. Hg, and a melting point of 34.5°.

If, instead of formic acid, there are used 450 parts of glacial acetic acid or 500 parts of propionic acid, there are obtained respectively 1110 parts of crude p-chlorophenoxyethylacetate (substance E) (pure substance: B.P.$_{.3}$=139–140°: D$_4^{20}$=1.223, $n_D^{20}$=1.5225) and 1190 parts of crude p-chlorophenoxyethylpropionate (substance F) (pure substance B.P.$_{.2.5}$=143–145°; D$_4^{20}$=1.238, $n_D^{20}$=1.5226).

Example 5

0.5 part of p-toluenesulfonic acid is added to 140 parts of phenoxyethanol. 70 parts of acetic anhydride are added slowly at 80–90° and the mixture then heated to 150–160° until no more aqueous acetic acid distils off. The last portions of acetic acid are removed under reduced pressure (200 mm. Hg). The reaction product is neutralized by the addition of 1 part of potash and filtered. There are obtained 177 parts of crude phenoxyethylacetate as a brownish liquid, D$_4^{20}$=1.112 (substance G). The pure product boils at 115–116° under a pressure of 3 mm. Hg; D$_4^{20}$=1.141, $n_D^{20}$=1.5108.

If, instead of phenoxyethanol, there are used 155 parts of o-cresoxyethanol or 170 parts of xylenyloxyethanol (prepared from a technical xylenol mixture), there are obtained respectively 195 parts of crude o-cresoxyethylacetate (substance H) (pure substance: B.P.$_{.3}$=122–124°, D$_4^{20}$=1.112, $n_D^{20}$=1.5082) and 210 parts of crude xylenyloxyethylacetate (substance J) (pure substance: B.P.$_{.2.5}$=129–131°; D$_4^{20}$=1.096, $n_D^{20}$=1.5042).

Example 6

240 parts of ethylene oxide are introduced at 140–150° into 820 parts of 2,4-dichlorophenol in which 3 parts of caustic soda are dissolved. 7 parts of sulfuric acid and 20 parts of Amberlite IR–120 are added at 100° and then 350 parts of acetic anhydride are run in in the course of one hour. The temperature is raised to 170° in the course of 2 hours, an acetic acid-water mixture being distilled off, and then a current of nitrogen is streamed through for 3 hours at the same temperature. After cooling, the reaction product is filtered and crude 2,4-dichlorophenoxyethylacetate is obtained as a neutral brownish liquid; D$_4^{20}$=1.321 (substance K). The pure substance, obtained by distillation under reduced pressure, has the following characteristics: B.P.$_{.3}$: 160–161°; D$_4^{20}$=1.356, $n_D^{20}$=1.5352.

If, instead of the acetic anhydride, there are used 500 parts of propionic acid, 2,4-dichlorophenoxyethylpropionate is obtained; D$_4^{20}$=1.288 (substance L).

Example 7

After the addition of 5 parts of potassium hydroxide to 780 parts of p-chlorophenol, 390 parts of 1,2-propylene oxide are introduced at 150°. Upon completion of the ensuing reaction, 8.5 parts of sulfuric acid are added, followed by 600 parts of propionic acid at 100–120°. The temperature is then raised to 160° in the course of two hours, and this temperature is maintained until practically no more propionic acid-water mixture distils off (about 4 hours). The last traces of acid are then distilled off under reduced pressure (200 mm. Hg). There is obtained a brownish, practically odorless liquid; D$_4^{20}$=1.158 (substance M). By distillation thereof under reduced pressure, there is obtained as principal fraction p-chlorophenoxy-1-propyl-2-propionate, B.P.$_{.5}$=143–145°, D$_4^{20}$=1.205, $n_D^{20}$=1.5193.

Example 8

After the addition of 1 part of caustic soda to 200 parts of 2,4,5-trichlorophenol, 54 parts of ethylene oxide are introduced at 140°. Upon completion of the ensuing reaction, 1.5 parts of sulfuric acid are added, followed by 100 parts of propionic acid, and the mixture then heated slowly to 170° while passing a weak current of nitrogen therethrough. After about 7 hours, excess propionic acid together with reaction water will have distilled off, and crude 2,4,5-trichlorophenoxyethylpropionate is obtained as a brownish, practically odorless liquid having a specific gravity of 1.371 at 20° (substance N). The main part of the product boils at 175–180° under a pressure of 3 mm. Hg; D$_4^{20}$=1.430, M.P. 29°.

If while otherwise proceeding in accordance with the preceding paragraph, but using 90 parts of ethylene oxide instead of 54 parts, the product of the formula

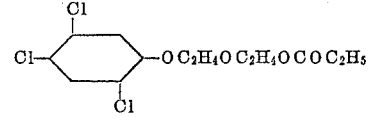

is obtained; D$_4^{20}$=1.343.

Example 9

152 parts of o-cresoxyethanol are heated to 160° together with 100 parts of monochloroacetic acid and 0.5 part of sulfuric acid. After no more water distils off, the apparatus is gradually evacuated. The esterification is complete after about 6 hours. The obtained brownish, practically odorless liquid (D$_4^{20}$=1.208) is insoluble in water but is readily soluble in the usual organic solvents (substance O). By distillation under reduced pressure, there is obtained pure o-cresoxyethyl-chloroacetate: B.P. 155–158°; D$_4^{20}$=1.244, $n_D^{20}$=1.5192.

Example 10

The following compounds are prepared according to the methods set forth in Examples 1 to 9:

p-Chlorophenoxyethylbutyrate, D$_4^{20}$=1.150
p-Chlorophenoxyethylisopentoate, D$_4^{20}$=1.152
p-Chlorophenoxybutyl-1,2-acetate, D$_4^{20}$=1.148
p-Chlorophenoxybutyl-2,3-acetate, D$_4^{20}$=1.148
2,4-dichlorophenoxyethylformate, D$_4^{20}$=1.363
2,4-dichlorophenoxyethyl-n-butoxyacetate, D$_4^{20}$=1.233
2,4-dichlorophenoxyethyl-n-butoxyethoxyacetate, D$_4^{20}$=1.214
2,4-dichlorophenoxyethyl-2-ethylhexoate, D$_4^{20}$=1.143
2,4-dichlorophenoxypropyl-(1,2)-formate, D$_4^{20}$=1.313
2,4-dichlorophenoxypropyl-(1,2)-acetate, D$_4^{20}$=1.290
2,4-dichlorophenoxypropyl-(1,2)-propionate, D$_4^{20}$=1,256
2,4-dichlorophenoxybutyl-(1,2)-acetate, D$_4^{20}$=1.228
2,4-dichlorophenoxybutyl-(2,3)-acetate, D$_4^{20}$=1.228
p-Chlorophenoxyethoxyethyl-acetate, D$_4^{20}$=1.206
p-Chlorophenoxyethoxyethoxyethyl-acetate, D$_4^{20}$=1.200
Trichloro-o-cresoxyethylacetate, viscous oil
Chloro-m-cresoxyethylacetate (substance P), D$_4^{20}$=1.310
o,p-Dibromophenoxyethylacetate (substance Q), D$_4^{20}$=1.497
Dibromocresoxyethylacetate, D$_4^{20}$=1.466
m-Cresoxyethylacetate (substance R), D$_4^{20}$=1.081
p-Cresoxyethylacetate, D$_4^{20}$=1.082
o-Phenylphenoxyethoxyethyl-acetate, D$_4^{20}$=1.134
p-Tert.-butylphenoxyethylacetate, D$_4^{20}$=1.032
o-Chlorophenoxypropyl-phenoxyacetate, viscous oil
o-Cyclohexylphenoxyethyl-propionate, D$_4^{20}$=1.042
β-Naphthoxyethylacetate, M.P. 38°
m-Methoxyphenoxyethylacetate, D$_4^{20}$=1.100
2,4-dichlorophenoxy-tetra-ethoxy-ethylacetate (substance S), D$_4^{20}$=1.215

The foregoing compounds are, in the crude state, brownish practically odorless liquids which are practically insoluble in water but readily soluble in the usual organic solvents. The corresponding pure substances are obtained as colorless liquids by distillation under reduced pressure.

*Example A*

A mixture of 40 parts of substance A (Example 1) with 20 parts of sodium oleyldodecaglycoloxyacetate and 40 parts of water is prepared. A dye bath (goods-to-liquor ratio 1:40) is prepared with 7.5 grams of the aforesaid mixture per liter and with 10% of a black disperse dyestuff (mixture of blue anthraquinone and yellow and red azo dyestuffs) (calculated relative to the weight of the material to be dyed), and the bath heated to boiling. A polyester fabric (Dacron) is dyed therein at the boil. There is obtained a level, deep-black dyeing. There is no odor problem during the dyeing in an open receptacle.

*Example B*

A mixture of 80% of substance B (Example 2) with 20% of the compound of the formula

as emulsifier yields, upon dilution with water, a highly stable emulsion. Dacron fabric is dyed for one hour at the boil in such an aqueous emulsion which contains 3.5 grams per liter of the aforesaid mixture, with 1.4% (calculated relative to the weight of the fabric) of the dyestuff of the formula

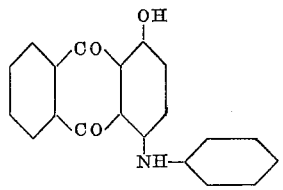

(bath ratio 1:40). A very level violet dyeing is obtained.

*Example C*

An aqueous emulsion is prepared which contains per liter 3.6 grams of a mixture of 80 parts of substance C (Example 3) with 20 parts of the emulsifier of the formula

In this bath, polyester fibers are dyed for 1 hour at the boil with 1.5% (relative to the weight of the fibers) of the dyestuff Color Index Disperse Orange 21 (goods-to-liquor ratio 1:30). The resultant dyeing is very level. There is no odor when the dyeing is carried out in an open receptacle.

*Example D*

Substance D (Example 4) is dissolved in the two-fold quantity of ethanol and 10 grams of the resultant solution are added per liter of dye bath which contains 1.5% of the dyestuff according to Swiss Patent No. 321,837, Dyestuff Mixture No. 2 (calculated relative to the weight of the material to be dyed). A Dacron fabric is dyed for one hour at the boil in this bath in a goods-to-bath ratio of 1:40. The so-obtained dyeing is level.

*Example E*

Substance E (Example 4) is admixed in a proportion of 4:1 by weight with an emulsifier mixture which consists of 80% of the compound of the formula

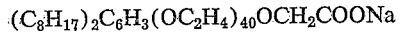

and 20% of the compound of the formula

To a dyebath which contains 1.2% of the dyestuff Color Index Disperse Yellow 23 (calculated relative to the weight of the fiber to be dyed), there are added—after stirring with a small quantity of water—3 grams per liter of the aforesaid mixture, and then a polyester fabric (Terylene) is dyed therein at the boil for 1 hour at a goods-to-liquor ratio of 1:40, no disagreeable odor being encountered. A very level dyeing is obtained, even if the dyeing be carried out in a closed apparatus. Corresponding dyeings carried out in the presence of chlorinated benzenes or of salicylic acid methylester as carrier yield under the same conditions in a closed apparatus unlevel, spotty dyeings (formation of condensate spots), and if the operation is carried out in an open apparatus there is a disagreeable odor.

*Example F*

By admixing 4 parts of substance F (Example 4) with 1 part of the compound

a preparation is obtained which can be stirred with water to yield a boiling-stable emulsion. A Dacron fabric is treated at the boil with an aqueous solution which contains 2 grams per liter of this preparation, the treatment being carried out for 15 minutes in a goods-to-liquor ratio of 1:40. 0.8% (relative to the weight of the fiber) of the dyestuff according to German Patent No. 106,925, Example 1, is then added, and dying carried out at the boil for 45 minutes. A very level dyeing is obtained.

*Example G*

The procedure according to Example F is followed, replacing substance F by substance G (Example 5) and adding 3% (relative to the weight of the fiber) of the dyestuff Color Index Disperse Blue 20. A powerful and very level dyeing is here also obtained.

*Example H*

2 parts of substance H (Example 5), 1 part of oleic acid and 1 part of morpholine are admixed. An emulsion obtained from this mixture by dilution with water to 4 grams per liter has added thereto 1.6% of the dyestuff Color Index Disperse Red 43 (calculated relative to the material to be dyed). Polyester fibers are dyed level in this dye bath in ¾ to 1 hour at the boil in a goods-to-liquor ratio of 1:40 and, as in all the preceding examples, there is no odor problem and no formation of condensate spots. Upon exposing a sample of the dyeing in daylight (to lightfastness 7), as well as after 100 hours in the fadeometer, there is no difference in lightfastness in comparison with a high temperature dyeing with the same dyestuff. However, if the known carrier o-phenylphenol is used instead of substance H, the fastness to light is greatly impaired and the dyeings turn brownish.

*Example J*

Arnel (cellulose triacetate fiber) is dyed at 90° for one hour in a goods-to-liquor ratio of 1:40 with 1.4% (relative to the weight of the fiber) of the dyestuff of the formula

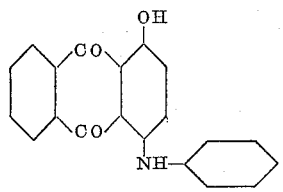

the dye bath containing 4 grams per liter of a mixture of equal parts by weight of substance J and the emulsifier of the formula

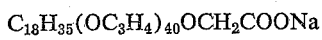

The resultant dyeing is much more level and deeper than when the dyeing is effected in the absence of substance J.

Example K 1 part of the morpholine salt of the compound of the formula $$(C_8H_{17})_2C_6H_3(OC_2H_4)_{40}OCH_2COOH$$

is admixed with 4 parts of substance K (Example 6). Polyester fibers are dyed for 1 hour at the boil with 3% (relative to the weight of the fiber) of the dyestuff Color Index Disperse Orange 20 with the addition of 2 grams of the said mixture per liter of bath in a goods-to-liquor ratio of 1:40. A very level and deep dyeing is obtained.

Example L

A high temperature dyeing with 1.6% of the dyestuff Color Index Disperse Red 43 on Dacron is treated for one hour at the boil with an aqueous emulsion containing 10 grams per liter of a mixture of 4 parts of substance L (Example 6) with 1 part of the compound $$(C_9H_{19})_2C_6H_3(OC_2H_4)_{30}OCH_2COONa$$

The dyeing loses half its strength. The other compounds of the present invention are also, like compound L, suitable for stripping or lightening dyeings.

Example M

Terylene is treated for 30 minutes at the boil (goods-to-liquor ratio 1:20) with an aqueous emulsion of 5 grams per liter of a mixture of equal parts by weight of substance M (Example 7) and triethanolamineoleate. The thus-pretreated material is quickly dyed at 95–100° from a dye bath which contains 1.8% of the dyestuff Color Index Disperse Red 1 (calculated relative to the weight of the material) (goods-to-liquor ratio 1:30) in very level manner.

Example N

Dacron is dyed at the boil for one hour at a goods-to-liquor ratio of 1:40 with 1.5% of the dyestuff Color Index Disperse Yellow 19 with the addition of 5 grams of soap per liter and 3 grams per liter of substance N (Example 8) diluted with a little ethanol. A very pure and level dyeing is obtained. This dyeing—and this applies also to all other herein-described dyeings—has a wash fastness which is at least equal to the corresponding dyeing obtained by the high temperature process without the addition of the new carrier.

Example O

Dacron fabric is printed with a printing paste which contains, per kilogram
700 grams of crystal gum 1:2,
30 grams of glycerin,
50 grams of the dyestuff of German Patent No. 1,061,925, Example 1,
30 grams of a mixture of 2 parts of substance O (Example 9) with 1 part of the compound of the formula $$(C_9H_{19})_2C_6H_3(OC_2H_4)_{60}OCH_2COONa$$

then dried and steamed for 20 minutes at 0.7 atm. pressure. A brilliant and level print with very good fastness properties is obtained.

Example P

The procedure according to Example O is followed, but with 80 grams of a black dyestuff mixture of blue anthraquinone and yellow and red azo dyestuffs, and with 40 grams of a mixture of 4 parts of substance P (Example 10), with 1 part of the triethanolamine salt of the compound of the formula $$(C_8H_{17})_2C_6H_3(OC_2H_4)_{40}OCH_2COOH$$

After printing and drying, steaming is effected for 40 minutes at ambient pressure. Very level prints are obtained.

Example Q

A cellulose acetate fabric is dyed at the boil for one hour at a goods-to-liquor ratio of 1:40 with 1.6% (calculated relative to the weight of the fabric) of the dyestuff Color Index Disperse Red 43 with addition of 6 grams per liter of a mixture of equal parts of substance Q (Example 10) and the compound of the formula $$C_{18}H_{35}(OC_2H_4)_{40}OCH_2COONa$$

No disagreeable odor appears during the boiling and the resultant dyeing is level.

Example R

A mixture of 80 parts of substance R (Example 10) with 20 parts of the compound of the formula $$(C_9H_{19})_2C_6H_3(OC_2H_4)_{30}OCH_2COONa$$

is stirred with a small quantity of water to yield a highly stable emulsion. Terylene is dyed at the boil for 45 minutes with 1.5% of the dyestuff of Swiss Patent No. 321,-837, Mixture No. 2, with the addition of 3 grams per liter of the aforesaid mixture, in a goods-to-liquor ratio of 1:40. The obtained dyeing is very level and has good fastness properties.

Example S

An acetate silk fabric is dyed at 80° and at a goods-to-liquor ratio of 1:50 with 1.5% (relative to the weight of the fabric) of the dyestuff Color Index Disperse Orange 21 with the addition of 3 grams per liter of the compound of the formula $$C_{18}H_{35}(OC_2H_4)_{12}OCH_2COONa$$

(=substance Z). A second dyeing is carried in exactly the same way but with the use of 3 grams per liter of a mixture of equal parts of substance Z and substance S (Example 10). When dyeing in the presence of substance S, the rate of exhaustion onto the fabric is significantly higher and there is obtained a deeper, but nevertheless more level, dyeing than when the dyeing is carried out without the said substance S.

The same effect is obtained in the dyeing of polyamide fibers and chlorinated fibers (vinyl chloride and vinylidene chloride polymers and copolymers) with disperse dyestuffs.

Having thus disclosed the invention, what is claimed is:

1. A method of dyeing or printing a member selected from the group consisting of polyester fibers, cellulose acetate fibers, polyamide fibers, polyvinyl chloride fibers, polyvinylidine chloride fibers and fibers of polyvinyl chloride-polyvinylidine chloride copolymer with a disperse dyestuff, which comprises effecting the dyeing or printing in the presence of, as auxiliary agent, a water-soluble ester of a compound of the formula $$Ar—(OA)_n—OH$$

wherein Ar is an aromatic radical, A is an alkylene radical with 2 to 4 carbon atoms, and $n$ is a whole number from 1 to 5 inclusive, with a member selected from the group consisting of an alkanoic acid, an alkoxy-alkanoic acid, and a phenoxyalkanoic acid.

2. A method of dyeing or printing a member selected from the group consisting of polyester fibers, cellulose acetate fibers, polyamide fibers, polyvinyl chloride fibers, polyvinylidine chloride fibers and fibers of polyvinyl chloride-polyvinylidine chloride copolymer with a disperse dyestuff, which comprises effecting the dyeing or printing in the presence of, as auxiliary agent, a water-soluble ester of a compound of the formula $$Ar—(OA)_n—OH$$

wherein Ar is an aromatic radical, A is an alkylene radical with 2 to 4 carbon atoms, and $n$ is a whole number from 1 to 5 inclusive, with a member selected from the group consisting of hydrocarbon carboxylic acids, and in the presence also of a surface active ethercarboxylic acid.

3. A method of dyeing or printing polyester fibers with a disperse dyestuff, which comprises effecting the dyeing or printing in the presence of, as auxiliary agent, a water-soluble ester of a compound of the formula $$Ar-(OA)_n-OH$$

wherein Ar is an aromatic radical, A is an alkylene radical with 2 to 4 carbon atoms, and $n$ is a whole number from 1 to 5 inclusive, with a member selected from the group consisting of an alkanoic acid, an alkoxy-alkanoic acid, and a phenoxyalkanoic acid.

4. A method of dyeing or printing cellulose acetate fibers with a disperse dyestuff, which comprises effecting the dyeing or printing in the presence of, as auxiliary agent, a water-soluble ester of a compound of the formula.

$$Ar-(OA)_n-OH$$

wherein Ar is an aromatic radical, A is an alkylene radical with 2 to 4 carbon atoms, and $n$ is a whole number from 1 to 5 inclusive, with a member selected from the group consisting of an alkanoic acid, an alkoxy-alkanoic acid, and a phenoxyalkanoic acid.

References Cited in the file of this patent

UNITED STATES PATENTS

| | | |
|---|---|---|
| 2,233,101 | Kern | Feb. 25, 1941 |
| 2,305,691 | Grossman | Dec. 22, 1942 |
| 2,759,964 | Beman | Aug. 21, 1956 |
| 2,759,966 | Beman | Aug. 21, 1956 |
| 2,881,045 | Mecco et al. | Apr. 7, 1959 |
| 2,923,593 | Olpin et al. | Feb. 2, 1960 |
| 2,992,877 | Hess et al. | July 18, 1961 |
| 3,023,072 | Dabrowski | Feb. 27, 1962 |